United States Patent
Riveros Urzua et al.

(10) Patent No.: US 8,801,830 B2
(45) Date of Patent: Aug. 12, 2014

(54) CONTINUOUS FIRE REDUCTION OF LIQUID COPPER

(75) Inventors: Gabriel Angel Riveros Urzua, Santiago (CL); Ricardo Ponce Herrera, Santiago (CL); Daniel Smith Cruzat, Santiago (CL); Andrzej Warczok, Barrie (CA); Torstein Arfin Utigard, Mississauga (CA); Tanai Marin Alvarado, Mississauga (CA)

(73) Assignees: Universidad de Chile (CL); Empresa Nacional de Mineria (CL)

( * ) Notice: Subject to any disclaimer, the term of this patent is extended or adjusted under 35 U.S.C. 154(b) by 1027 days.

(21) Appl. No.: 12/735,185

(22) PCT Filed: Dec. 18, 2008
(Under 37 CFR 1.47)

(86) PCT No.: PCT/IB2008/003545
§ 371 (c)(1),
(2), (4) Date: Oct. 11, 2011

(87) PCT Pub. No.: WO2009/077851
PCT Pub. Date: Jun. 25, 2009

(65) Prior Publication Data
US 2012/0227543 A1    Sep. 13, 2012

(30) Foreign Application Priority Data
Dec. 19, 2007   (CL) .................................... 3701-2007

(51) Int. Cl.
*C22B 9/05* (2006.01)
*C22B 15/00* (2006.01)

(52) U.S. Cl.
CPC ............... *C22B 9/05* (2013.01); *C22B 15/0052* (2013.01)
USPC .............................................. 75/641; 75/648

(58) Field of Classification Search
CPC .............................. C22B 9/05; C22B 15/0052
USPC ...................................................... 75/641, 648
See application file for complete search history.

(56) References Cited

U.S. PATENT DOCUMENTS 3,868,248 A    2/1975  Neu
4,389,247 A    6/1983  Won et al.

FOREIGN PATENT DOCUMENTS

WO    W/O 2006/029162    3/2006
WO    WO 2006/029246     3/2006

*Primary Examiner* — George Wyszomierski
*Assistant Examiner* — Tima M McGuthry Banks
(74) *Attorney, Agent, or Firm* — Wolff & Samson, PC.

(57) ABSTRACT

This invention refers to a pyrometallurgical method for the continuous reduction of oxidized copper through combustion gases in countercurrent to the continuous gravitational flow of liquid copper that disperses through a packed bed reactor with ceramic grains.

7 Claims, 4 Drawing Sheets

THE COPPER CONTINUOUS FIRE REDUCTION SCHEMATIC PRINCIPLE.

THE COPPER CONTINUOUS FIRE REDUCTION SCHEMATIC PRINCIPLE.

PRIOR ART

CONTINUOUS FIRE REDUCTION OF LIQUID COPPER

PREVIOUS ART

Smelting of copper concentrates produces matte and slag. Copper matte is converted into blister copper in Peirce-Smith, Hoboken discontinuous converters or by using continuous converting processes such as the Kennecott-Outokumpu or Mitsubishi processes. Blister copper is directed to fire refining process prior electro-refining.

The fire refining process is a classical batch process consisting of four stages: charging, oxidation and impurities slagging, reduction and anode casting. After oxidation and slagging, copper contains from 5000 to 10000 ppm of oxygen. Oxygen must be reduced to 800 or 1,200 ppm prior to the anodes casting.

Continuous conversion processes, as the Mitsubishi and Kennecott-Outokumpu processes, and the classical conversion processes in Peirce-Smith or Hoboken converters use to work in the blister over-oxidation mode due to their tendency to work with higher grade matte. Thus, blister copper may contain from 4,000 to 6,000 ppm of oxygen. If content of impurities, especially arsenic and antimony, is low enough for not requiring addition of fluxes, blister copper needs only to be degasified, and is ready for reduction.

Copper is reduced with fossil reducers or ammonia. The most commonly used reducers are oil and natural gas. Oil or natural gas is injected with air into the bath of molten copper through tuyères. Copper reduction faces significant limitations in the process rate and efficiency of reducer utilization. Reducer efficiency is below 50%. Injection of liquid or gaseous reducer into the copper produces black fumes in off-gas due to the thermal decomposition of hydrocarbons. Partial carbon utilization in reduction of oxygen from copper causes the presence of carbon particles in the reduction gases, which are partly burnt if the burner flame is oxidizing. Carbon particles are transferred to the furnace off-gas, creating black fumes, which are emitted through a chimney to the atmosphere.

L. Klein suggested the use of a gaseous reducer instead of wood, "Gaseous Reduction of Oxygen-Containing Copper", J. of Metals, Col 13, No. 8, August 1961, 545-547, U.S. Pat. No. 2,989,397 June 1961. The study showed that injection of natural gas with air is a better solution that the injection of natural gas only into the liquid copper. The method for deoxidizing copper with reformed natural gas and the related apparatus were patented by Phelps Dodge Corporation in USA and Canada. C. Kuzell, M. Fowler, S. Davis and L. Klein: "Apparatus for Reforming Gases"; U.S. Pat. No. 3,071,454, January 1963; "Gaseous Reduction of Oxygen-Containing Copper", CA 668,598, August 1963.

R. Beck, C. Andersen and M. Messner patented the process for deoxidizing copper with natural gas-air mixtures, "Process for Deoxidizing Copper with Natural Gas-Air Mixtures", U.S. Pat. No. 3,619,177, November 1971.

The company Anaconda patented a process for deoxidizing copper in a vascular furnace through the injection of the mixture of natural gas or oil and water vapor; W. Foard and R. Lear, "Refining Copper", U.S. Pat. No. 3,529,956, September 1970.

J. Henderson and W. Johnston patented for ASARCO the method of copper reduction in a vascular furnace by injection of natural gas through tuyères "Gas poling of copper", U.S. Pat. No. 3,623,863, November 1971.

G. Mckerrow and D. Panell reviewed in the paper "Gaseous deoxidization of Anode Copper at the Noranda Smelter", Canadian Metallurgical Quarterly, Vol. 11, No. 4, 1972, 629-633, the evolution of methods of copper deoxidization in Noranda smelter using natural gas injected through tuyères in a vascular furnace. J. Oudiz made a general review of the copper reduction processes ("Poling processes for copper refining", J. of Metals, Vol 25, December 1973, 35-38).

C. Toro and V. Paredes "Sustitución parcial del petróleo diesel por Enap-6 como agente reductor en el proceso de obtención de cobre anódico en la fundición Potrerillos" ("Partial substitution of diesel oil with Enap-6 as reducing agent in the process for obtaining anodic copper at the Potrerillos Smelter"), 34th IIMCh Annual Convention, November 1983, Rancagua, developed and demonstrated in an industrial scale the possibilities of the use of heavy oil (ENAP-6), which has a higher sulphur content and costs less, in copper reduction.

The only continuous fire reduction process patented is that of Wuth et al, W. Wuth, G. Melcher, H. Weigel, Klockner Humbolt Deutz AG, "Process for Continuously Refining Contamined Copper in the Molten Phase", ZA 7603039, Apr. 27, 1977; Klockner Humbolt Deutz AG, "Method of Continuous Refining of Impure Copper in the Liquid Phase" GB 1525786, Sep. 20, 1978; H. Weigel, G. Melcher, W. Wuth (Klockner Humbolt Deutz AG), "Method for Continuous Refining of Contaminated Copper in the Molten Phase" US Pat. No. 127,408, Nov. 28, 1978, was developed at a small pilot scale at the beginning of the 70s, and never found an industrial application. The process is based on the continuous flow of copper through two reverberating furnaces. In the first furnace copper is oxidized by air blown through vertical nozzles and in the second furnace copper is reduced with reducing oil or gas injected through vertical nozzles.

The new continuous copper reduction process in a packed bed with charcoal patented by Warczok et al, A. Warczok, G. Riveros, T. Utigard, T. Martin, G. Wastavino, H. Schwarze, D. Smith, J. Sanhueza, A. Balocchi, L. Gonzalez, S. Wanner, A. Fielzweiser, P. Gray, "Método de Refinación a Fuego Continuo de Cobre" ("Copper Continuous Fire Refinement Method"), Chilean patent application CL 2269-04, September 2004, has been developed at a pilot industrial scale. Reduction of oxidized copper takes place in a reaction with a packed bed with charcoal.

DESCRIPTION OF INVENTION

This invention refers to a hydrometallurgical method for continuous reduction of oxidized copper through combustion gases, which use the gravitational flow of liquid copper through a reactor with packed bed.

Sources of oxidized copper are:
a) oxidizing reactor of the continuous fire refining process;
b) continuous conversion of matter, which operate in the copper over-oxidization mode;
c) the retaining furnace receiving the over-oxidized blister copper from the Peirce-Smith converter; in certain smelters operating in this mode copper contains approximately 5,000 ppm of oxygen; and
d) scrap fusion furnace.

Blister copper of continuous or batch conversion may be reduced if content of impurities is acceptable for electro-refining, and only needs to be deoxidized.

This invention has the following advantages as compared to the traditional copper reduction methods:
a) considerably lower investment, due to the small size of the reactor needed for the same production capacity;
b) lower working needs, due to the totally continuous operation mode;

c) improved safety conditions due to the reduction of operations requiring exposure of operators to high temperatures;
d) a more precise production process control due to the reduced inertia of the system, as copper oxygen content and temperature may be maintained within a specific range;
e) considerably lower fuel consumption, particularly for operation with a matte continuous conversion process and anodes continuous casting—two casting wheels. No waiting periods and no inter-operation pauses;
f) higher reducer efficiency, from 80% to 90%, due to the countercurrent flow and larger reaction specific area; and
g) drastic reduction of black fumes (black coal) emission, and reduction of the negative impact of the process on the environment.

BRIEF DESCRIPTION OF FIGURES

FIG. No. 1 show a schematic diagram that illustrates the oxidized copper intense, continuous reduction principle in a reactor with packed bed.

DETAILED DESCRIPTION OF FIGURES

Figure 1:
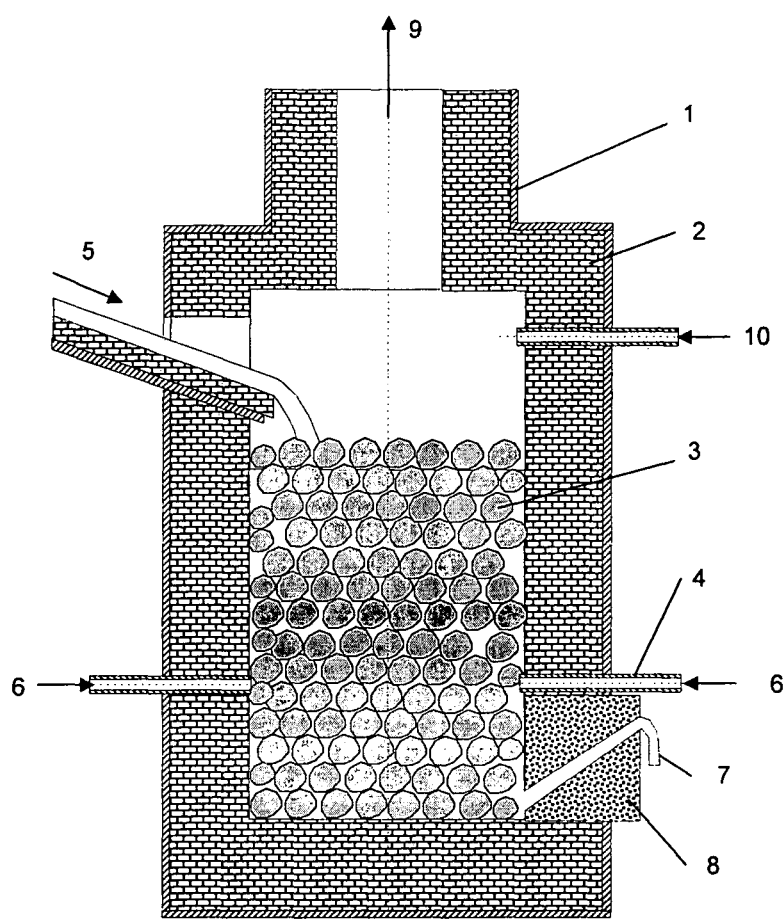
Figure 2:
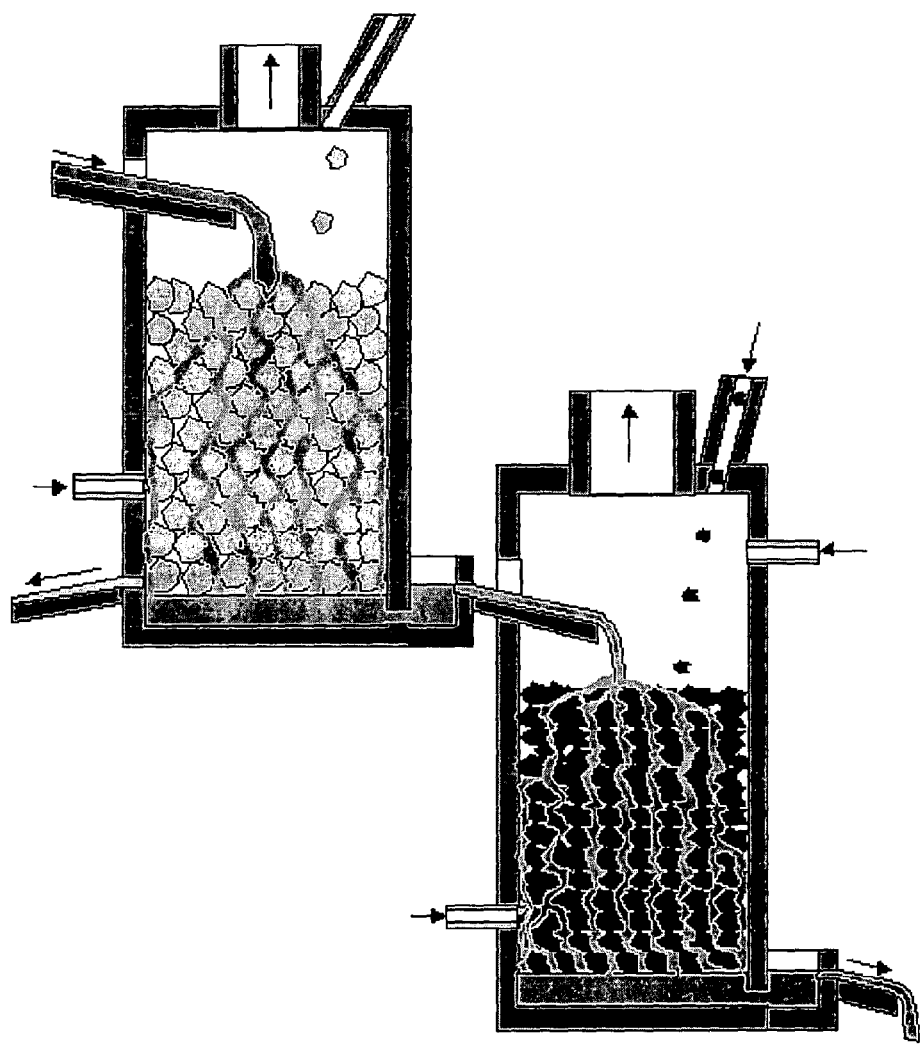
FIG. 2 shows the copper continuous fire reduction schematic principle.
Figure 3:
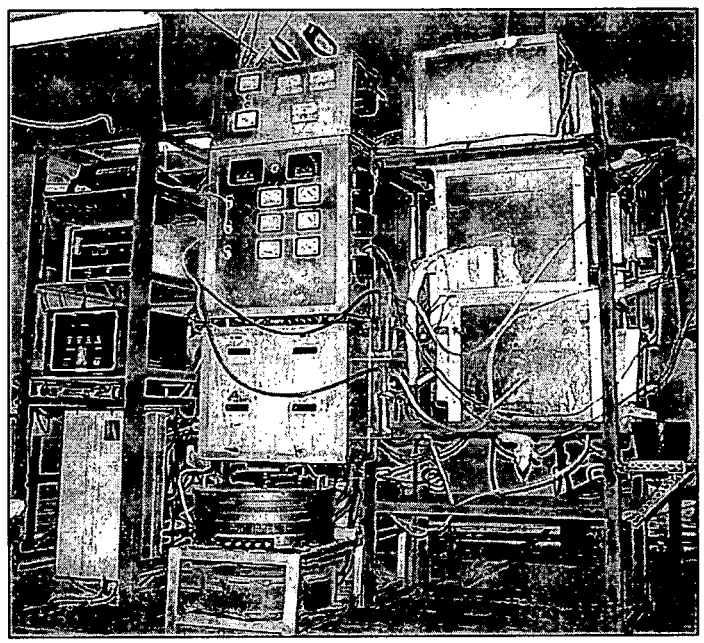
FIG. 3 shows a photo of the pilot plant assembles at the facilities of the University of Chile.
Figure 4:
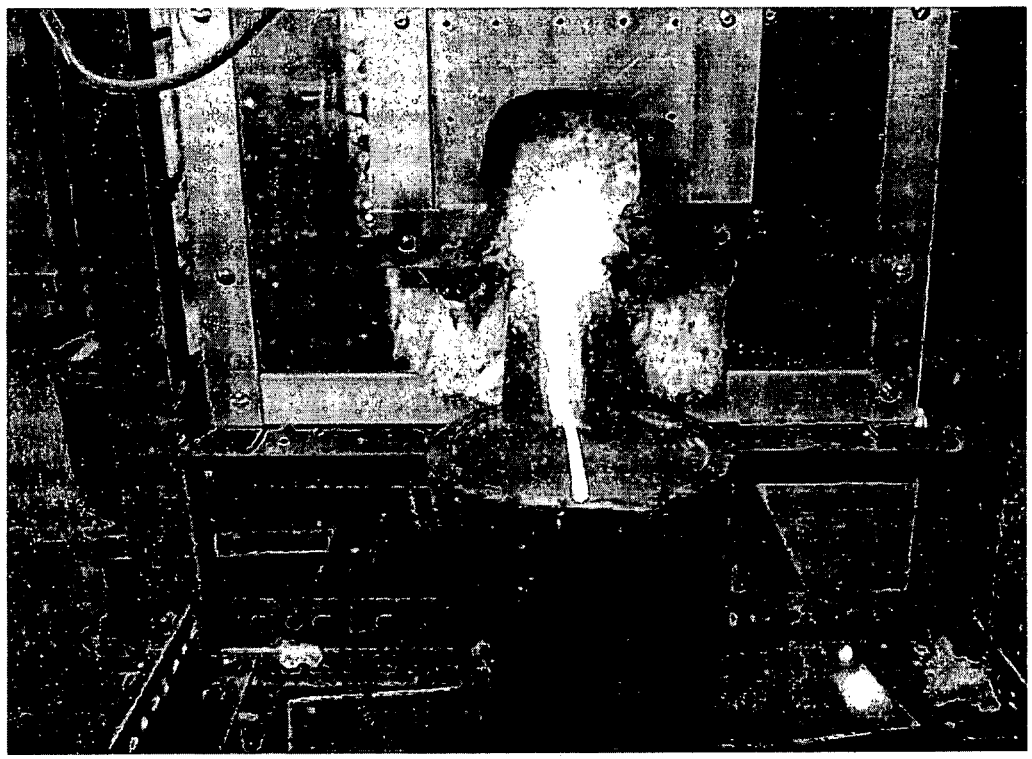
FIG. 4 shows a photo of the liquid copper bleeding process at the pilot scale.

FIG. 1 illustrates the process principle. The bed of the reactor (1, 2) is filled with ceramic grains (3).

Thus, this invention corresponds to a continuous copper reduction method consisting of the following stages:
a) transfer of oxidized liquid copper from the aforementioned sources through a canal (5) to the reduction reactor;
b) deoxidizing of copper due to dispersion of liquid copper and intense flow;
c) injection of a mixture of air and natural gas or oil (6) through tuyères (4), partial combustion of reducing oil;
d) reduction in the reactor of oxidized copper containing between 4,000 and 9,000 ppm of oxygen:
  i. dispersion of liquid copper and downward gravitational flow through the packed bed with ceramic grains;
  ii. injection of a mixture of air and natural gas or oil through tuyères;
  iii. partial combustion:

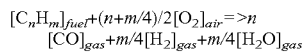
$$[C_nH_m]_{fuel}+(n+m/4)/2[O_2]_{air} => n[CO]_{gas}+m/4[H_2]_{gas}+m/4[H_2O]_{gas}$$

iv. upwards countercurrent flow of combustion gases containing carbon monoxide and hydrogen inside the packed bed;
  v. deoxidization of copper:

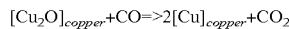
$$[Cu_2O]_{copper}+CO => 2[Cu]_{copper}+CO_2$$

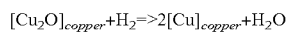
$$[Cu_2O]_{copper}+H_2 => 2[Cu]_{copper}+H_2O$$

e) continuous evacuation of reduced copper (7) containing between 800 and 1,200 ppm of oxygen through a siphon or siphon block (8);
f) air injection through a tuyere (10) above the packed bed for post-combustion of gases released from the bed;
  i. $CO + \frac{1}{2} O2 => CO2$
  ii. $H2 + \frac{1}{2} O2 => H2O$
g) Evacuation of gases from furnace through the chimney (9); and
h) Transfer of refined copper directly to an anodes casting wheel or to a transportation pot for its transfer to a retaining furnace (7).

The oxidized copper dispersed on the surface of the ceramic packed bed flows downward in the form of veins or drops that are in contact with the hot gas that flows countercurrent, and contains hydrogen and carbon monoxide. The very high liquid copper surface area and volume ratio results in a high reduction ratio. Natural gas, propane and oil injected with a sub-stechiometric quantity of air generate hot reducing gases, which in turn deoxidize the copper. Temperature of copper and its content of oxygen may be precisely controlled through the air and fuel flow.

PROCESS EXAMPLES

Example 1

Continuous copper refining in a small smelter with a production capacity of 40,000 tons/year, which corresponds to a continuous copper flow of 5 tons/hour.

Blister copper flows from the retaining furnace to the oxidizing furnaces defined by the method defined in the patent description by authors Warczok et al., A. Warczok, G. Riveros, T. Utigard, T. Martin, G. Wastavino, H. Schwarze, D. Smith, J. Sanhueza, A. Balocchi, L. Gonzalez, S. Wanner, A. Fielzweiser, P. Grau, "Metodo de Refinacion a Fuego Continua de Cobre" ("Copper Continuous Fire Refining Method"), Chilean patent application CL 2269-04, September 2004. Oxidized copper temperature is maintained in a range from 1,190° C. to 1,210° C. and content of oxygen in a range from 7,500 to 8,500ppm. The oxidized copper flows through a 4 meters long canal directly to the reduction furnace. The round reduction furnace has a diameter of 1.2 meters and a height of 1.8 meters, and is filled with chrome-magnesite grains (of a diameter of 30 to 40 mm). The mixture of air (80 to 100 Nm³/h) and natural gas (20 to 30Nm³/h) is injected through the tuyere over the chrome-magnesite packed bed through three tuyeres. The natural gas plays a fuel-reducer role. The additional air (100 Nm³/h) is injected through the tuyere over the packed bed for post-combustion of gases. The temperature of the refined copper is maintained within a range of 1,190° C. and 1,200° C., and content of oxygen within a range of 800 to 1,200 ppm. Copper is continuously evacuated to a pot and transported to the retaining furnace.

Example 2

The Kenneth-Outokumpu continuous conversion process produces blister copper with an oxygen level of 5,000 ppm in a smelter with a production capacity of 160,000 tons/year. Copper production corresponds to a continuous flow of 20 tons/h of copper. Content of impurities is acceptable for electro-refining. Blister copper must only be deoxidized. Oxidized copper flows through a 12 meters long anal directly to the reduction furnace. The reduction furnace has a diameter of 2.2 meters and a height of 3.5 meter, and is filled with chrome-magnesite grains (of a diameter of 30 to 40 mm). The mixture of air (350 Nm³/h) and natural gas (80 Nm³/h) is injected through three tuyeres over the packed bed.

The additional air (400 Nm³/h) is blown through a tuyere over the packed bed for post-combustion of gases. The temperature of the refined copper is maintained within a range of 1,190° C. and 1,200° C., and content of oxygen within a range of 800 to 1,200 ppm. Copper is continuously bled or evacuated through a siphon-type block, and flows directly to the anodes casting wheel. Use of two casting wheels ensures continuous operation.

The invention claimed is:

1. A pyrometallurgical method for continuous reduction of oxygen contained in oxidized copper, comprising:
   a. Continuous loading of oxidized liquid copper into a packed bed reactor;
   b. Injection of a liquid or gaseous reducing mixture into the packed bed reactor;
   c. Reduction of oxygen contained in the oxidized liquid copper with hot reducing gases generated by incomplete combustion of the reducing mixture, to obtain reduced copper and dispersing the oxidized liquid copper through gravitational flow from ceramic grains to other grains with neutral chemical means;
   d. Continuous evacuation of educed copper from the packed bed reactor;
   e. Injection of air over the packed bed reactor for post-combustion of hot reducing gases released from the packed bed reactor;
   f. Evacuation of post-combustion .gases from the sacked bed reactor; and reduction with hot reducing gases released in countercurrent from the partial combustion of natural gas, propane, diesel oil or bunker oil.

2. The pyrometallurgical method according to claim 1, wherein the reduction step (c) further comprises following sub-stages:
   i. Dispersion of the oxidized liquid copper over the packed bed reactor;
   ii. Gravitational distribution of the oxidized liquid copper through the packed bed reactor;
   iii. Partial combustion of the reducing mixture to generate the hot reducing gases, wherein the reducing mixture is a mixture of air and natural gas or oil, and the hot reducing gases contain carbon monoxide and hydrogen;
   iv. Upwards counter-current flow of the hot reducing gases through the packed bed reactor; and
   v. Deoxidization of the oxidized liquid copper.

3. The pyrometallurgical method according to claim 2, wherein injection of the reducing mixture flows through tuyéres into the reactor depends on a size of the reactor and its losses of heat, which vary, and the flow of the reducing mixture through tuyéres vary from 3 to 10 k/t of copper, and flow of air is from 20 to 100 $Nm^3$/t of copper.

4. The pyrometallurgical method according to claim 2, wherein additional air is injected over the packed bed to obtain full post-combustion of the residual hot reducing gases released from the packed bed.

5. The pyrometallurgical method according to claim 1, wherein injection of the reducing mixture flows through tuyéres into the reactor depends on a size of the reactor and its losses of heat, which vary, and the flow of the reducing mixture through tuyéres vary from 3 to 10 kg/t of copper, and flow of air is from 20 to 100 $Nm^3$/t of copper.

6. The pyrometallurgical method according to claim 1, wherein additional air is injected over the packed bed to obtain full post-combustion of the residual hot reducing gases released from the packed bed.

7. The pyrometallurgical method according to claim 1, wherein additional air is injected over the packed bed to obtain full post- combustion of the residual hot reducing gases released from the packed bed.

* * * * *

UNITED STATES PATENT AND TRADEMARK OFFICE
CERTIFICATE OF CORRECTION

PATENT NO. : 8,801,830 B2  
APPLICATION NO. : 12/735185  
DATED : August 12, 2014  
INVENTOR(S) : Riveros Urzúa et al.

Page 1 of 1

It is certified that error appears in the above-identified patent and that said Letters Patent is hereby corrected as shown below:

On the title page item (75), the name of Inventor delete "Gabriel Angel Riveros Urzua" and insert --Gabriel Angel Riveros Urzúa--

In the claims

Claim 1, column 5, line 26, delete "Evacuation of post-combustion .gases from" and insert --Evacuation of post-combustion gases from--

Signed and Sealed this  
Twenty-sixth Day of January, 2016

Michelle K. Lee  
*Director of the United States Patent and Trademark Office*